United States Patent
Miyazawa et al.

(10) Patent No.: US 11,379,674 B2
(45) Date of Patent: Jul. 5, 2022

(54) MAGNETIC FIELD GENERATION DEVICE, MAGNETIC RECORDING MEDIUM PROCESSING APPARATUS, AND MAGNETIC FIELD GENERATION METHOD

(71) Applicant: NIDEC SANKYO CORPORATION, Nagano (JP)

(72) Inventors: Keiji Miyazawa, Nagano (JP); Yohei Shimizu, Nagano (JP); Satoru Aoki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/252,422

(22) PCT Filed: Jun. 6, 2019

(86) PCT No.: PCT/JP2019/022531
§ 371 (c)(1),
(2) Date: Dec. 15, 2020

(87) PCT Pub. No.: WO2019/240006
PCT Pub. Date: Dec. 19, 2019

(65) Prior Publication Data
US 2021/0256228 A1    Aug. 19, 2021

(30) Foreign Application Priority Data
Jun. 15, 2018   (JP) .............................. JP2018-114461

(51) Int. Cl.
*G06K 7/08* (2006.01)
*H01F 7/06* (2006.01)

(52) U.S. Cl.
CPC ............. *G06K 7/087* (2013.01); *H01F 7/064* (2013.01)

(58) Field of Classification Search
CPC ........ G06K 7/087; G06K 13/06; H01F 7/064; G07D 9/00; G07D 11/00
See application file for complete search history.

(56) References Cited

U.S. PATENT DOCUMENTS
2013/0077796 A1* 3/2013 Risbo .................. H03G 11/008
381/55

FOREIGN PATENT DOCUMENTS
JP    H1062266 A    3/1998
JP    2004328954 A   11/2004
(Continued)

OTHER PUBLICATIONS

B. Cheng, A. N. A. Alla, X. Huang and J. Lin, "Design of a Multi-Wave Low Frequency Magnetic Fields Generator for Medical Applications," 2007 2nd IEEE Conference on Industrial Electronics and Applications, 2007, pp. 2851-2853, doi: 10.1109/ICIEA.2007.4318933. (Year: 2007).*

(Continued)

*Primary Examiner* — Matthew Mikels
(74) *Attorney, Agent, or Firm* — Cantor Colburn LLP

(57) ABSTRACT

A magnetic field generation device may include a coil generating a magnetic field, a drive part configured to apply a voltage to the coil or supply a current to the coil, a monitoring part configured to acquire state information whose value is varied together with temperature of the coil, and a control part which controls the voltage applied by the drive part or the current supplied by the drive part based on the state information acquired by the monitoring part.

20 Claims, 10 Drawing Sheets

(56) References Cited

FOREIGN PATENT DOCUMENTS

| | | |
|---|---|---|
| JP | 2008504599 A | 2/2008 |
| JP | 2013037555 A | 2/2013 |

OTHER PUBLICATIONS

International Search Report for International Application No. PCT/JP2019/022531; dated Aug. 20, 2019.

* cited by examiner

MAGNETIC FIELD GENERATION DEVICE, MAGNETIC RECORDING MEDIUM PROCESSING APPARATUS, AND MAGNETIC FIELD GENERATION METHOD

CROSS REFERENCE TO RELATED APPLICATION

This is the U.S. national stage of application No. PCT/JP2019/022531, filed on Jun. 6, 2019. Priority under 35 U.S.C. § 119(a) and 35 U.S.C. § 365(b) is claimed from Japanese Application No. 2018-114461, filed Jun. 15, 2018, the disclosure of which is also incorporated herein by reference.

TECHNICAL FIELD

The present invention relates to a magnetic field generation device, a magnetic recording medium processing apparatus and a magnetic field generation method.

BACKGROUND ART

In recent years, a crime called skimming has been increasing which swindles information recorded in a magnetic card such as a bank card. As a countermeasure to such skimming, a technique has been considered in which a device structured to generate a disturbing magnetic field is attached to a card insertion port of a card reader (see, for example, Patent Literature 1).

Citation List

Patent Literature

[PTL 1] Publication Number of Japanese Translation of PCT International Application No. 2008-504599

SUMMARY OF THE INVENTION

Problems to be Solved by the Invention

A common disturbing magnetic field generation device described above is structured so that an electric current is supplied to a coil at random timing to generate a magnetic field and thereby, magnetic noise is applied to a skimming head to disturb its output and to disturb a swindle of magnetic data. However, when a magnetic field is repeatedly generated with a coil, the coil generates heat by an electric current supplied to the coil, and the coil may be damaged.

In view of the problem described above, the present invention provides a magnetic field generation device, a magnetic recording medium processing apparatus and a magnetic field generation method, each of which is capable of preventing damage of a coil while maintaining security.

Means to Solve the Problems

To solve the above-mentioned problem, at least an embodiment of the present invention may provide a magnetic field generation device including a magnetic field generation part structured to generate a magnetic field, a drive part configured to apply a voltage to the magnetic field generation part or to supply a current to the magnetic field generation part, a monitoring part configured to acquire state information whose value is varied together with temperature of the magnetic field generation part, and a control part configured to control the voltage which is applied by the drive part, or configured to control the current which is supplied by the drive part based on the state information acquired by the monitoring part.

In the magnetic field generation device in accordance with at least an embodiment of the present invention, magnitude of the voltage applied to the magnetic field generation part for generating a disturbing magnetic field, or magnitude of the current supplied to the magnetic field generation part for generating a disturbing magnetic field may be changed depending on state information whose value is varied together with temperature of the magnetic field generation part. Therefore, according to at least an embodiment of the present invention, skimming can be prevented while avoiding damage of the magnetic field generation part.

In at least an embodiment of the present invention, the control part may change, based on a comparison result between a value indicated by the state information acquired by the monitoring part and a predetermined threshold value, the voltage applied by the drive part to the magnetic field generation part from a presently applied voltage to a different voltage which is different from the presently applied voltage, or the current supplied by the drive part to the magnetic field generation part from a presently supplied current to a different current which is different from the presently supplied current. In this case, the voltage or the current may be changed based on a comparison result between the state information and the threshold value and thus, control of the change can be performed easily.

In the magnetic field generation device in accordance with at least an embodiment of the present invention, the monitoring part may acquire a current value flowing through the magnetic field generation part as the state information, and the control part may control the voltage applied by the drive part or the current supplied by the drive part based on the current value acquired by the monitoring part. In this case, it is sufficient that only a current value is measured and thus, an additional component such as a temperature sensor is unnecessary and a cost of the device can be reduced.

In the magnetic field generation device in accordance with at least an embodiment of the present invention, in a case that the current value acquired by the monitoring part becomes lower than a predetermined first current threshold value, the control part may change the voltage applied by the drive part to the magnetic field generation part to a second voltage whose maximum value is lower than a maximum value of a first voltage which is presently applied. In this case, the control can be easily performed by providing a reference for changing the voltage to a lower level. Further, damage of the magnetic field generation part can be prevented beforehand.

In the magnetic field generation device in accordance with at least an embodiment of the present invention, after the control part has changed the voltage applied to the magnetic field generation part to the second voltage, when the current value acquired by the monitoring part exceeds a second current threshold value which is larger than the first current threshold value, the control part may change the voltage applied to the magnetic field generation part to the first voltage. In this case, since a reference for returning the voltage to the original value is provided, the control can be easily performed.

In the magnetic field generation device in accordance with at least an embodiment of the present invention, the control part may output a predetermined fixed magnetic field pattern, the drive part may apply a voltage corresponding to the fixed magnetic field pattern outputted from the control part to the magnetic field generation part, and the monitoring part may acquire a current value flowing through the magnetic field generation part when the drive part applies the voltage corresponding to the fixed magnetic field pattern to the magnetic field generation part. In this case, a current value flowing through the magnetic field generation part can be easily measured.

In at least an embodiment of the present invention, the magnetic field generation device may include a table in which current values and temperatures are associated with each other, and the control part may read out a temperature associated with a current value acquired by the monitoring part from the table, and the control part may control the voltage applied by the drive part based on the temperature read out. In this case, the voltage applied to the magnetic field generation part can be controlled with the temperature of the magnetic field generation part as a reference.

In the magnetic field generation device in accordance with at least an embodiment of the present invention, when the temperature read out from the table exceeds a predetermined first temperature threshold value, the control part may change the voltage applied by the drive part to the magnetic field generation part to a second voltage whose maximum value is lower than a maximum value of a first voltage which is presently applied. In this case, the control can be easily performed by providing a reference for changing the voltage to a lower level.

In the magnetic field generation device in accordance with at least an embodiment of the present invention, after the voltage applied to the magnetic field generation part has been changed to the second voltage, when the temperature read out from the table becomes lower than a second temperature threshold value which is smaller than the first temperature threshold value, the voltage applied by the drive part to the magnetic field generation part may be changed to the first voltage. In this case, the control can be easily performed by providing a reference for returning the voltage to the original value.

To solve the above-mentioned problem, at least an embodiment of the present invention may provide a magnetic recording medium processing apparatus including a card insertion port into which a magnetic card is inserted, an information reading part structured to read predetermined information from the magnetic card inserted into the card insertion port, and a magnetic field generation device structured to disturb illegal reading of magnetic data recorded in the magnetic card. The magnetic field generation device may include a magnetic field generation part structured to generate a magnetic field, a drive part configured to apply a voltage to the magnetic field generation part or to supply a current to the magnetic field generation part, a monitoring part configured to acquire state information whose value is varied together with temperature of the magnetic field generation part, and a control part configured to control the voltage which is applied by the drive part, or configured to control the current which is supplied by the drive part based on the state information acquired by the monitoring part.

In the magnetic recording medium processing apparatus in accordance with at least an embodiment of the present invention, when predetermined information is to be read from an inserted magnetic card, depending on state information whose value is varied together with temperature of the magnetic field generation part, magnitude of the voltage applied to the magnetic field generation part for generating a disturbing magnetic field may be changed, or magnitude of the current supplied to the magnetic field generation part may be changed. Therefore, according to at least an embodiment of the present invention, skimming can be prevented while avoiding damage of the magnetic field generation part.

To solve the above-mentioned problem, at least an embodiment of the present invention may provide a magnetic field generation method including processing applying a voltage to a coil which generates a magnetic field or supplying a current to the coil, processing acquiring state information whose value is varied together with temperature of the coil, and processing controlling a voltage applied to the coil or a current supplied to the coil based on the state information acquired.

In the magnetic field generation method in accordance with at least an embodiment of the present invention, depending on state information whose value is varied together with temperature of the coil, magnitude of the voltage applied to the coil for generating a disturbing magnetic field may be changed, or magnitude of the current supplied to the coil for generating a disturbing magnetic field may be changed. Therefore, according to at least an embodiment of the present invention, skimming can be prevented while avoiding damage of the magnetic field generation part.

In the magnetic field generation method in accordance with at least an embodiment of the present invention, processing may be performed in which a value indicated by the acquired state information and a predetermined threshold value are compared with each other and, based on the comparison result, processing may be performed in which the voltage applied to the coil is changed from a presently applied voltage to a different voltage which is different from the presently applied voltage, or processing may be performed in which the current supplied to the coil is changed from a presently supplied current to a different current which is different from the presently supplied current. In this case, the voltage or the current is changed based on the comparison result of the state information with the threshold value and thus, the control of the change can be performed easily.

In the magnetic field generation method in accordance with at least an embodiment of the present invention, processing may be performed in which a current value flowing through the coil is acquired as the state information, and processing may be performed in which, based on the acquired current value, the voltage applied to the coil is controlled, or the current supplied to the coil is controlled. In this case, it is sufficient that only a current value is measured and thus, an additional component such as a temperature sensor is unnecessary and a cost of the device can be reduced.

In the magnetic field generation method in accordance with at least an embodiment of the present invention, processing may be performed in which, in a case that the acquired current value becomes lower than a predetermined first current threshold value, the voltage applied to the coil is changed to a second voltage whose maximum value is lower than a maximum value of a first voltage which is presently applied. In this case, the control can be easily performed by providing a reference for changing the voltage to a lower level.

In the magnetic field generation method in accordance with at least an embodiment of the present invention, processing may be performed in which a temperature associated with the acquired current value is read out from a table in which current values and temperatures are associated with each other, and processing may be performed in which the voltage applied to the coil is controlled based on the temperature read out from the table. In this case, the voltage applied to the coil can be controlled with temperature of the coil as a reference.

In the magnetic field generation method in accordance with at least an embodiment of the present invention, in a case that the temperature read out from the table exceeds a predetermined first temperature threshold value, processing may be performed in which the voltage applied to the coil is changed to a second voltage whose maximum value is lower than a maximum value of a first voltage which is presently applied. In this case, the control can be easily performed by providing a reference for changing the voltage to a lower level.

Effects of the Invention

As described above, in the present invention, damage of the coil can be prevented while maintaining security.

DESCRIPTION OF EMBODIMENTS

Embodiments of the present invention will be described below with reference to the accompanying drawings.

Mounting Example of Magnetic Field Generation Device

Figure 1:
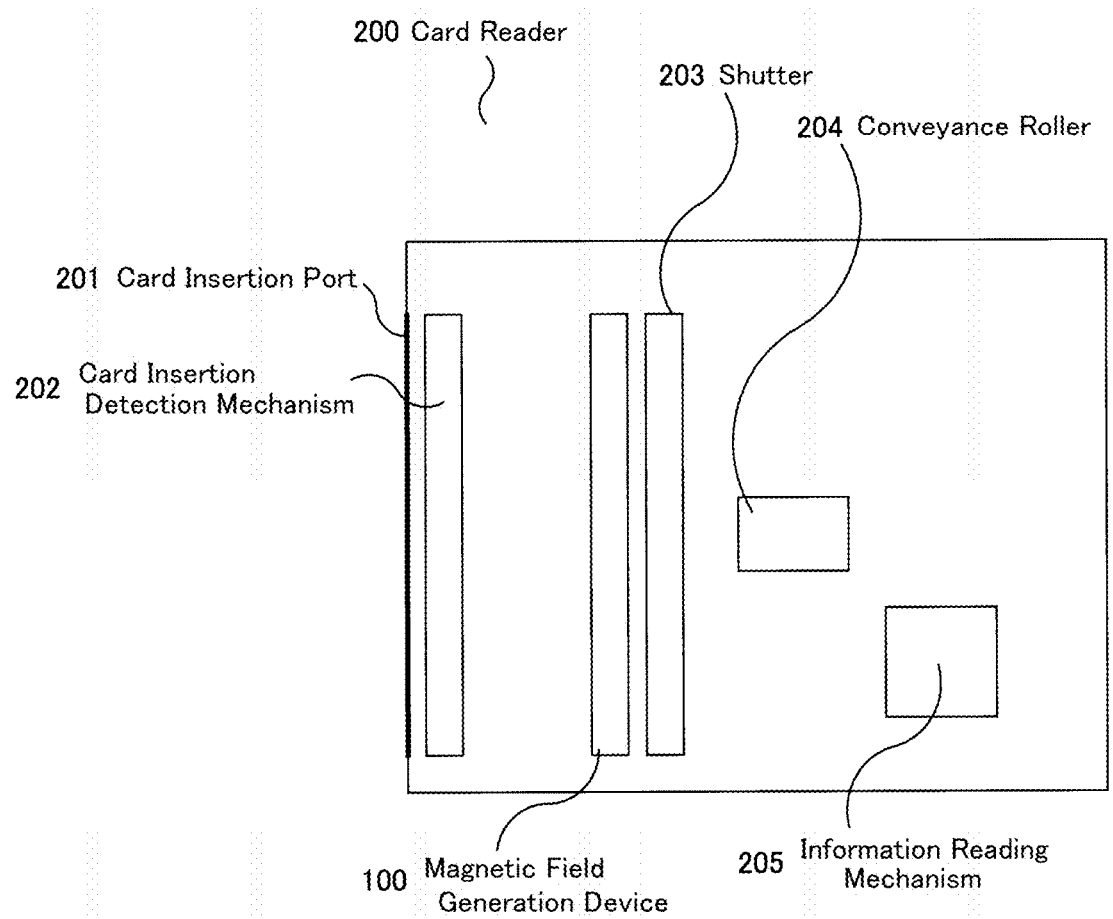
FIG. 1 is a view showing a structural example of a card reader on which a magnetic field generation device in accordance with the present invention is mounted.

FIG. 1 is a view showing a structural example of a card reader on which a magnetic field generation device in accordance with the present invention is mounted. In this example, a card reader is a magnetic recording medium processing apparatus which is structured to read information from a magnetic card to which predetermined information is written (recorded) by using a magnetic method and perform predetermined processing. A magnetic field generation device 100 is a device for disturbing illegal reading of magnetic data recorded in a magnetic card, and its detailed internal structure will be described below. A card reader 200 on which the magnetic field generation device 100 is mounted includes, as shown in FIG. 1, a card insertion port 201, a card insertion detection mechanism 202, a shutter 203, a conveyance roller 204, and an information reading mechanism 205. The card insertion detection mechanism 202 detects that a magnetic card has been inserted into the card insertion port 201. The conveyance roller 204 conveys the magnetic card inserted into the card insertion port 201. The information reading mechanism 205 reads information from the inserted magnetic card.

First Embodiment

Figure 2:
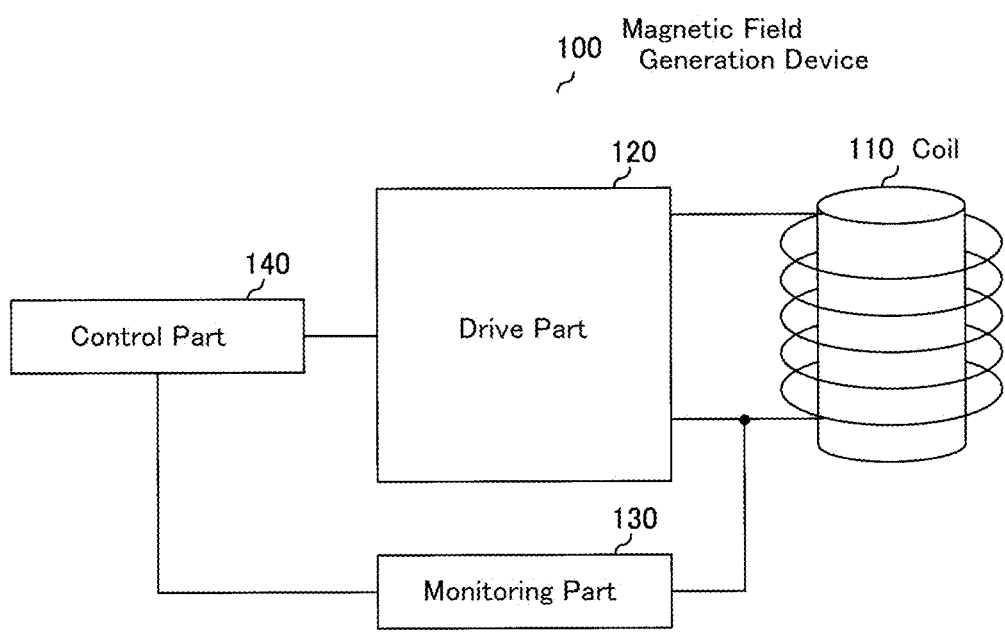
FIG. 2 is a view showing a magnetic field generation device in accordance with a first embodiment of the present invention.

FIG. 2 is a view showing a magnetic field generation device in accordance with a first embodiment of the present invention. A magnetic field generation device 100 in this embodiment is a magnetic field generation device which is mounted on the card reader 200 shown in FIG. 1 and, as shown in FIG. 2, includes a coil 110, a drive part 120, a monitoring part 130 and a control part 140. The magnetic field generation device 100 is provided in the magnetic card reader and is, for example, provided at a position where magnetic noise (disturbing magnetic field) can be applied to a skimming head, for example, at a position around an insertion port for a medium on which information is recorded by using magnetism (hereinafter, referred to as a magnetic card). FIG. 2 shows an example of principal structure elements in accordance with this embodiment among structure elements included in the magnetic field generation device 100 in this embodiment.

The coil 110 is a magnetic field generation part to which a voltage is applied and thereby an electric current flows to generate a magnetic field.

The drive part 120 applies a voltage to the coil 110. The drive part 120 applies a voltage corresponding to a predetermined disturbing magnetic field pattern and a fixed magnetic field pattern outputted from the control part 140 to the coil 110.

The monitoring part 130 acquires state information which is varied together with temperature of the coil 110. In this embodiment, the state information is a value of a current flowing through the coil 110. The monitoring part 130 measures (acquires) a current value of an electric current flowing through the coil 110 when the drive part 120 applies the voltage corresponding to the fixed magnetic field pattern to the coil 110. Further, the monitoring part 130 may be provided with a function which detects disconnection, a short circuit and the like of the coil 110.

The control part 140 controls a voltage applied by the drive part 120 to the coil 110 based on state information (in this embodiment, a current value flowing through the coil 110) acquired by the monitoring part 130. The control part 140 changes a voltage applied by the drive part 120 to the coil 110 to a voltage (second voltage) whose maximum value is lower than a maximum value of a presently applied voltage (first voltage) in a case that a current value measured (acquired) by the monitoring part 130 becomes equal to a first predetermined current threshold value or becomes lower than the first current threshold value. After the control part 140 has changed the voltage applied to the coil 110 to the second voltage, in a case that a value of the current which is measured (acquired) by the monitoring part 130 reaches a second current threshold value, which is a value larger than the first current threshold value, or exceeds the second current threshold value, the control part 140 changes (returns) the voltage applied to the coil 110 to the first voltage. Further, the control part 140 outputs a predetermined fixed magnetic field pattern in order that the monitoring part 130 measures the current value. In this case, the control part 140 outputs the fixed magnetic field pattern in a predetermined cycle (for example, one second cycle). The fixed magnetic field pattern may be outputted at random timing. An example of the fixed magnetic field pattern is that the drive part 120 applies a predetermined voltage in a pulse shape to the coil 110 only once. The fixed magnetic field pattern may be modified so that the drive part 120 applies a predetermined voltage in a pulse shape to the coil 110 twice to measure a current value between the two pulses.

Figure 3:
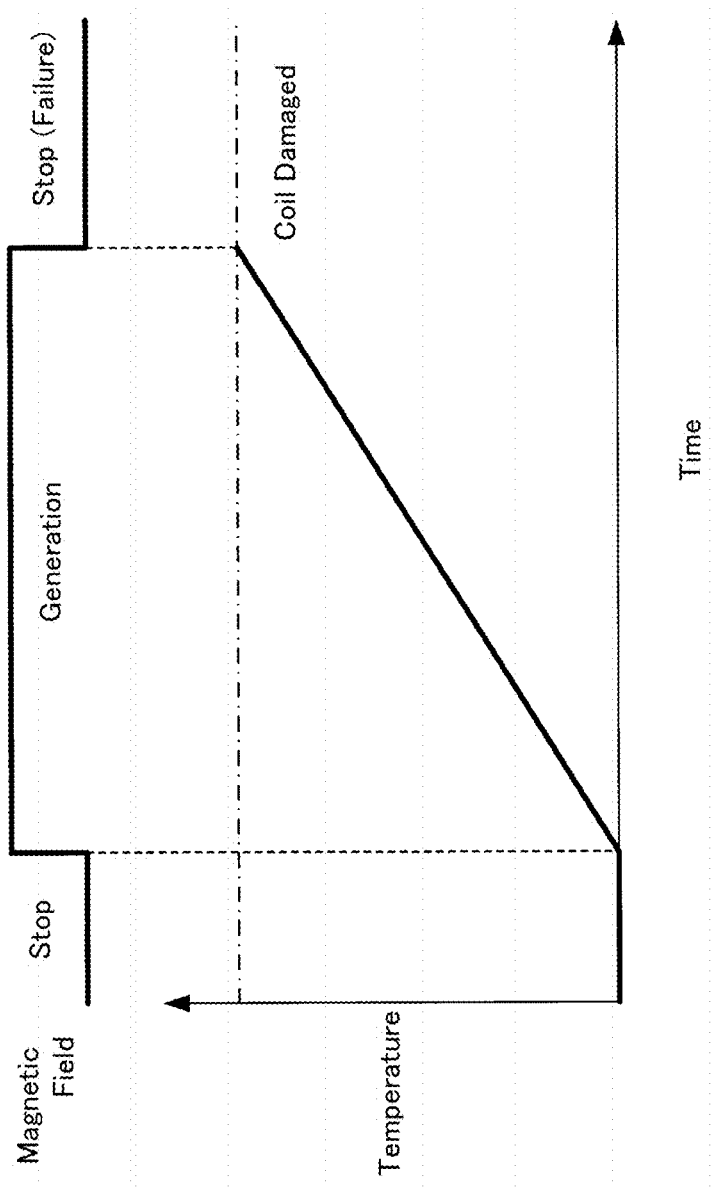
FIG. 3 is a view showing an example of a temporal change state of coil temperature in a case that a common disturbing magnetic field is generated.

FIG. 3 is a view showing an example of a temporal change state of coil temperature in a case that a common disturbing magnetic field is generated. As shown in FIG. 3, when a voltage is applied to a coil and an electric current is supplied, a magnetic field is generated. A temperature of the coil rises with passage of time of the magnetic field generation. When the temperature of the coil reaches a certain predetermined temperature, the coil is damaged due to increased heat and generation of the magnetic field stops.

According to the present invention, control is performed so as to reduce a rise of temperature of the coil for preventing the damage of the coil.

A resistance value of a conducting wire structuring the coil 110 changes depending on temperature of the coil 110. Specifically, in a case that the temperature of the coil 110 is low, the resistance value is small and, when the temperature of the coil 110 is high, the resistance value is large. Therefore, when a voltage value applied to the coil 110 is constant, in a case that temperature of the coil 110 is low, magnitude of a current flowing through the coil 110 becomes large and, in a case that temperature of the coil 110 is high, magnitude of a current flowing through the coil 110 becomes small.

Figure 4:
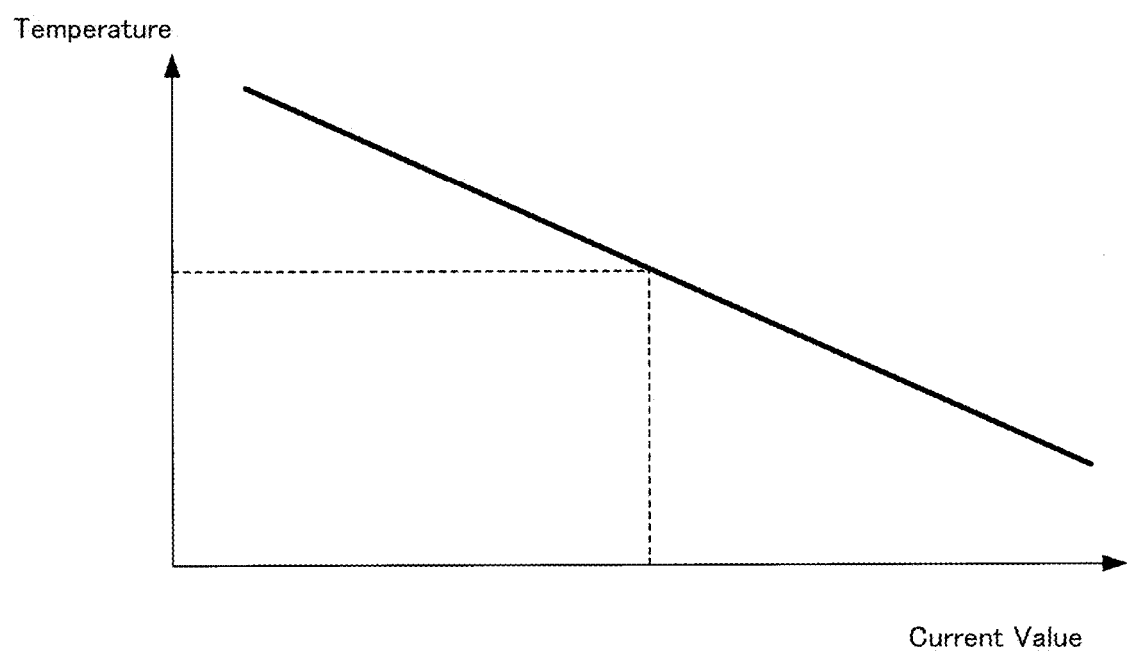
FIG. 4 is a graph showing an example of a relationship between a current value flowing through a coil shown in FIG. 2 and temperature of the coil.

FIG. 4 is a graph showing an example of a relationship between a current value flowing through the coil 110 shown in FIG. 2 and temperature of the coil 110. As shown in FIG. 4, when a voltage value applied to the coil 110 is constant, in a case that temperature of the coil 110 is low, a current value flowing through the coil 110 is large and, in a case that temperature of the coil 110 is high, a current value flowing through the coil 110 becomes small.

Figure 5:
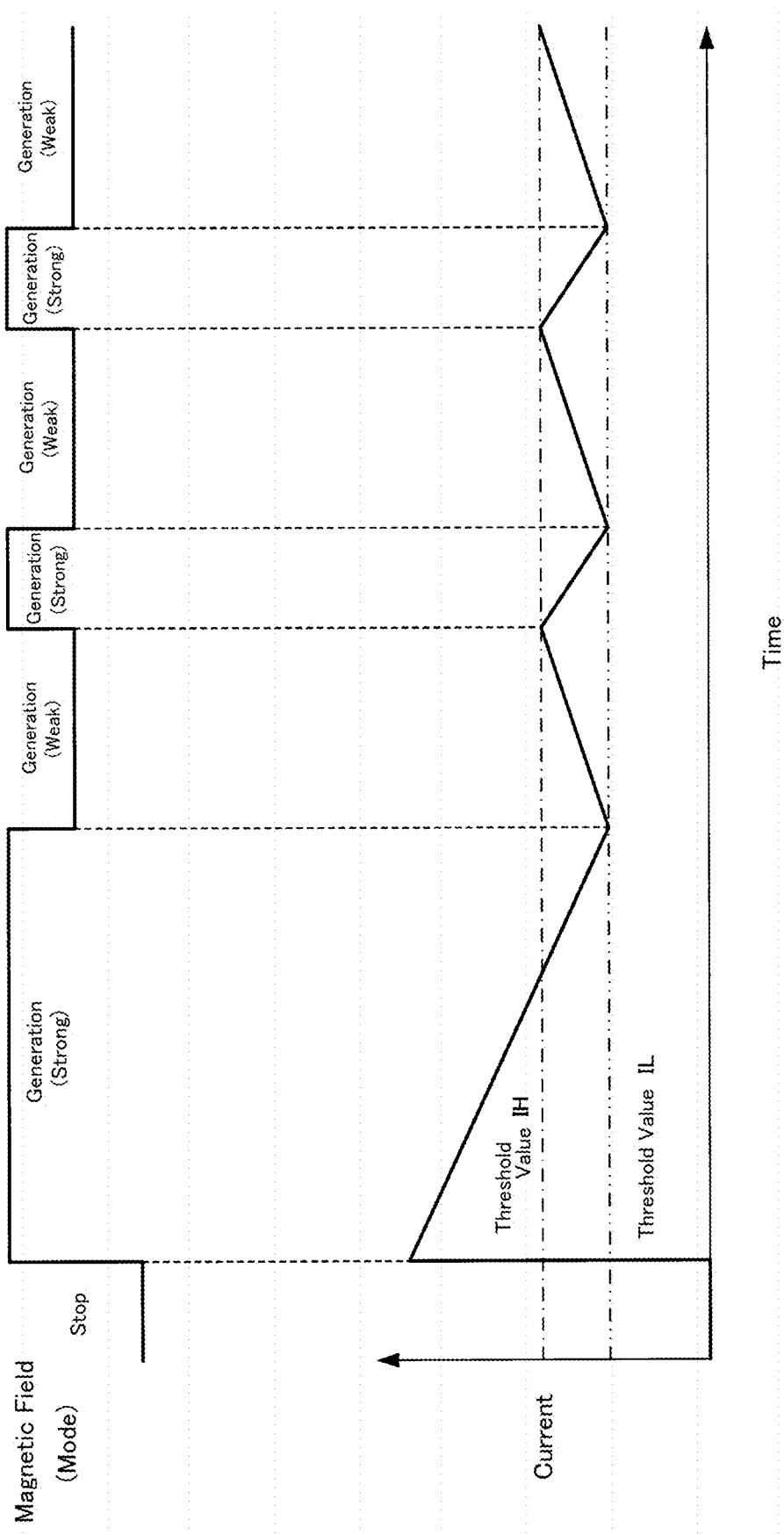
FIG. 5 is a view showing an example of magnetic field generation control in a control part shown in FIG. 2.

FIG. 5 is a view showing an example of magnetic field generation control in the control part 140 shown in FIG. 2. In the example shown in FIG. 5, a temporal change of a current is shown so as to be linearly increased or decreased. However, this indication is for convenience of description and, actually, a temporal change of the current does not always change linearly.

First, in a stop state of a disturbing magnetic field generation, a voltage (first voltage) is applied to supply a current to the coil 110 so as to generate a magnetic field having predetermined intensity. A value of the first voltage is random and is provided with a level which is capable of sufficiently disturbing skimming by a magnetic field generated from the coil 110. Further, an operation mode which is performed by applying the first voltage is a "strong mode". After that, when temperature of the coil 110 is increased, a current value flowing through the coil 110 becomes small and, when the current value becomes lower than a first current threshold value (threshold value "IL"), the control part 140 changes the voltage applied by the drive part 120 to the coil 110 to a voltage (second voltage) whose maximum value is lower than the maximum value of the first voltage which is presently applied. The second voltage is set in a level which is capable of disturbing skimming to some extent by a magnetic field generated from the coil 110. Further, an operation mode which is performed by applying the second voltage is a "weak mode". When the second voltage is applied, the temperature of the coil 110 is lowered and the current value flowing through the coil 110 becomes large. After that, when the current value flowing through the coil 110 exceeds the second current threshold value (threshold value "IH") which is larger than the first current threshold value, the control part 140 changes the voltage applied by the drive part 120 to the coil 110 to the first voltage (applied voltage is returned) from the second voltage which is presently applied. As a result, the operation mode is returned to the "strong mode". After that, based on a comparison of the current value flowing through the coil 110 with the two current threshold values, the control part 140 changes the operation mode.

Figure 6:
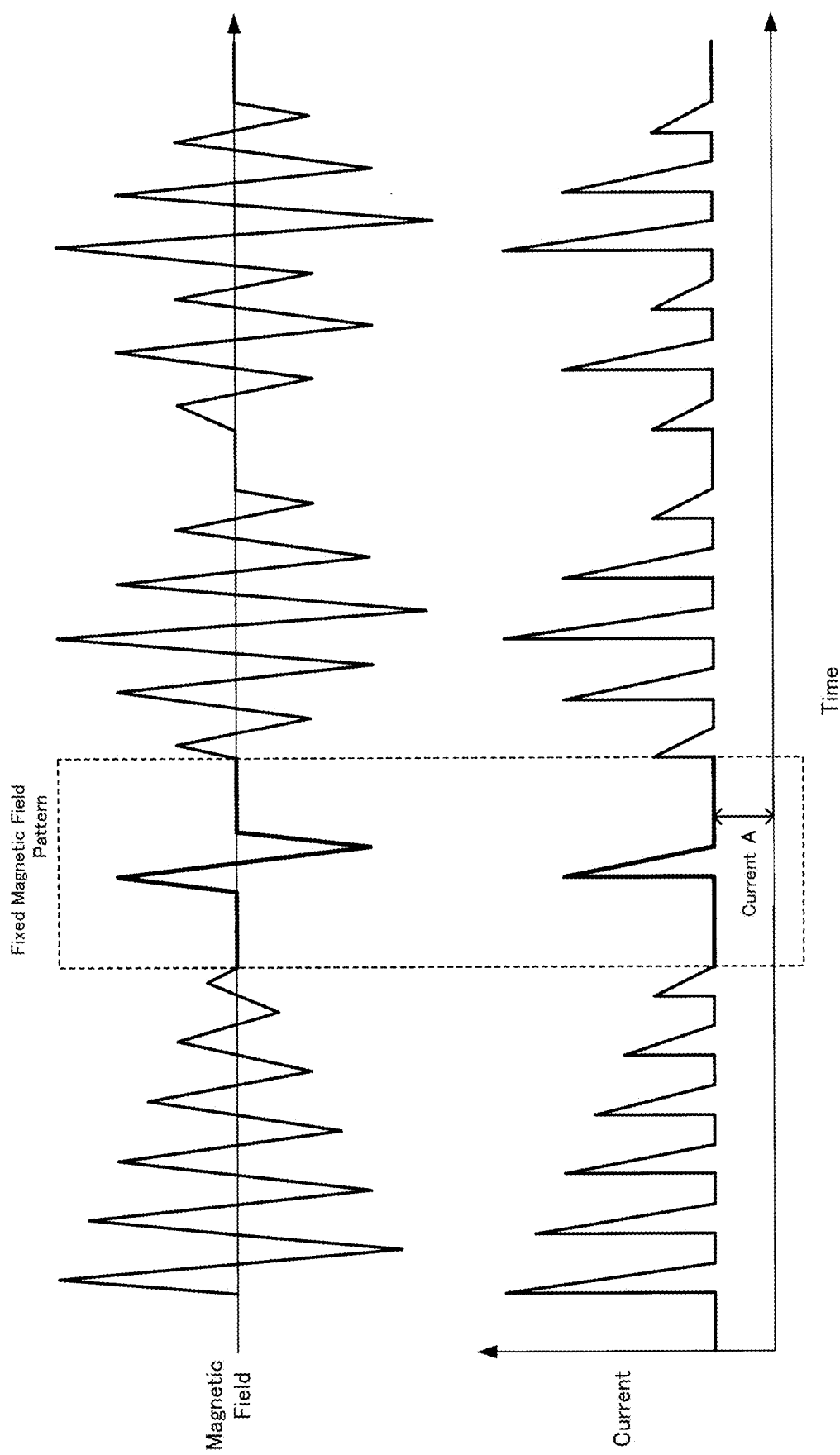
FIG. 6 is a view showing an example of a relationship between a fixed magnetic field pattern generated in a coil by a control part using a drive part shown in FIG. 2 and a current value measured by a monitoring part.

FIG. 6 is a view showing an example of a relationship between the fixed magnetic field pattern generated in the coil 110 by the control part 140 using the drive part 120 shown in FIG. 2 and the current value measured by the monitoring part 130. As shown in FIG. 6, during an operation that the magnetic field generation device 100 prevents skimming, the drive part 120 applies a voltage to the coil 110 at random timing and intensity to generate a magnetic field according to control from the control part 140. The control part 140 generates the fixed magnetic field pattern in the coil 110 by using the drive part 120 in an interval between these random generations of the magnetic field. The monitoring part 130 measures a current "A" which is occurred when the fixed magnetic field pattern is generated in the coil 110. The current "A" is easily measured in a portion of the fixed magnetic field pattern where the current value is stable. Alternatively, it may be configured that a current is measured when the disturbing magnetic field pattern is generated without generating the fixed magnetic field pattern.

Figure 7:
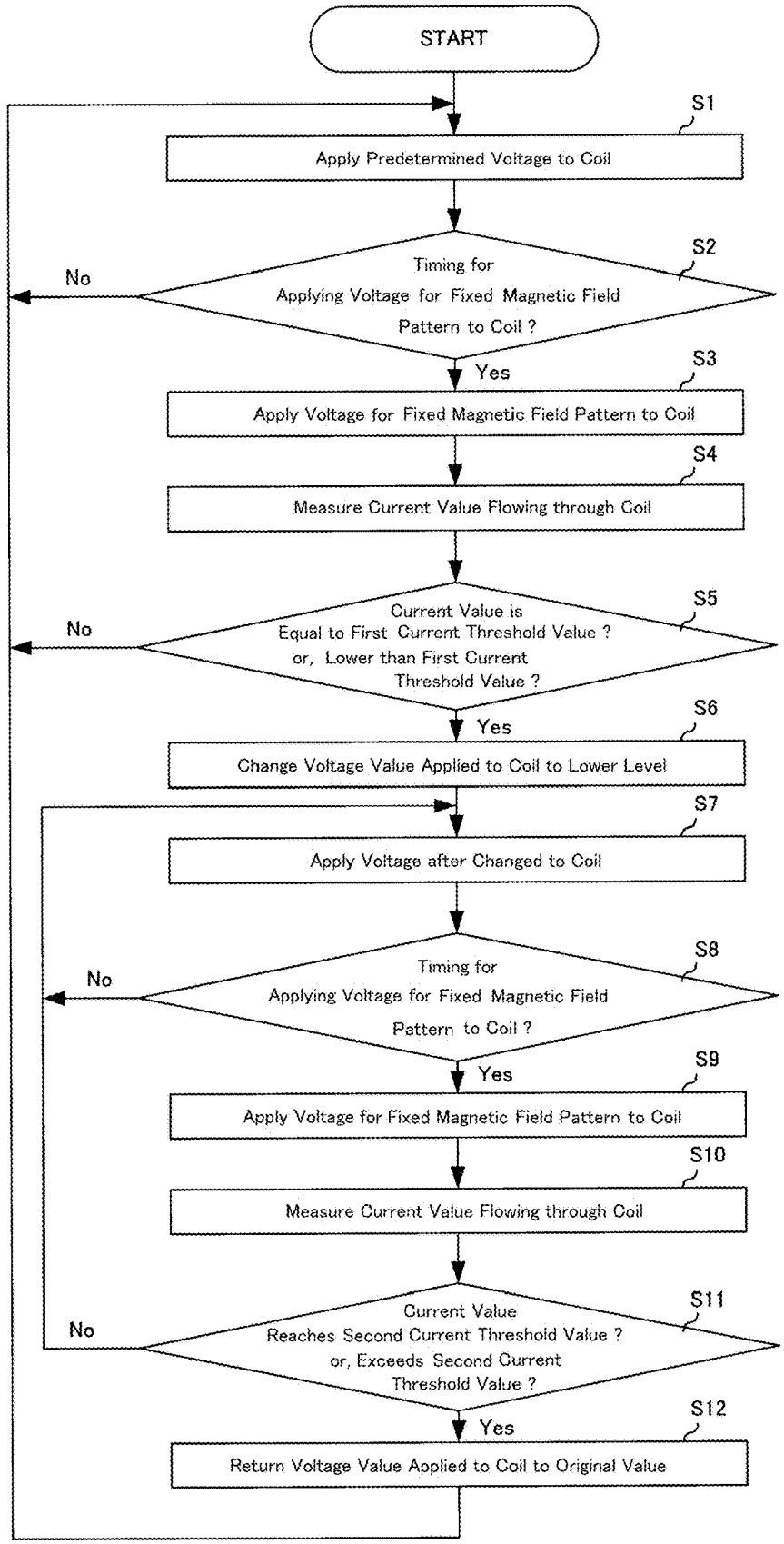
FIG. 7 is a flow chart for explaining an example of a magnetic field generation method in the magnetic field generation device shown in FIG. 2.

Next, a magnetic field generation method in the magnetic field generation device 100 shown in FIG. 2 will be described below. FIG. 7 is a flow chart for explaining an example of a magnetic field generation method in the magnetic field generation device 100 shown in FIG. 2.

First, the control part 140 applies the voltage (first voltage) to the coil 110 by using the drive part 120 (step S1). As a result, a current flows through the coil 110 and the coil 110 generates a disturbing magnetic field. An operation mode of the disturbing magnetic field generation at this time is the "strong mode". The control part 140 determines whether it is timing for applying a voltage corresponding to a predetermined fixed magnetic field pattern to the coil 110 by the drive part 120 or not (step S2). This timing may be set in advance or may be calculated depending on an operating state of the magnetic field generation device 100 or surrounding environment conditions. In a case of timing when the drive part 120 applies a voltage corresponding to the predetermined fixed magnetic field pattern to the coil 110, the control part 140 outputs the predetermined fixed magnetic field pattern and the drive part 120 applies a voltage corresponding to the fixed magnetic field pattern outputted from the control part 140 to the coil 110 (step S3). When the voltage corresponding to the fixed magnetic field pattern is applied to the coil 110, the monitoring part 130 measures a current value flowing through the coil 110 (step S4).

The control part 140 determines whether a current value measured by the monitoring part 130 becomes equal to the first current threshold value which is set in advance, or becomes lower than the first current threshold value or not (step S5). In a case that the current value measured by the monitoring part 130 becomes equal to the first current threshold value or, in a case that the current value becomes lower than the first current threshold value, the control part 140 changes the voltage applied by the drive part 120 to the coil 110 to a voltage whose maximum value is lower than the maximum value of the presently applied voltage (step S6). The drive part 120 applies the voltage after changed to the coil 110 (step S7). The operation mode of the disturbing magnetic field generation at this time is the "weak mode". After that, the control part 140 determines whether it is timing of the drive part 120 for applying the voltage corresponding to the predetermined fixed magnetic field pattern to the coil 110 or not (step S8). In a case of timing when the drive part 120 applies the voltage corresponding to the predetermined fixed magnetic field pattern to the coil 110, the control part 140 outputs the predetermined fixed magnetic field pattern and the drive part 120 applies the voltage corresponding to the fixed magnetic field pattern outputted from the control part 140 to the coil 110 (step S9). The processing of the step S9 may be the same as the processing of the step S3 or may apply a voltage corresponding to an operation mode which is operated at that time. When the voltage corresponding to the fixed magnetic field pattern is applied to the coil 110, the monitoring part 130 measures a current value flowing through the coil 110 (step S10).

The control part 140 determines whether a current value measured by the monitoring part 130 has reached the second current threshold value which is set in advance, or exceeds the second current threshold value or not (step S11). In a case that the current value measured by the monitoring part 130 has reached the second current threshold value or, in a case that the current value exceeds the second current threshold value, the control part 140 returns the voltage applied by the drive part 120 to the coil 110 to the original voltage, in other words, to the voltage applied in the step S1 (step S12).

In accordance with an embodiment of the present invention, the control part 140 may be configured that, in a case that a current value acquired by the monitoring part 130 becomes lower than the predetermined first current threshold value, the drive part 120 intermittently applies a voltage to the coil 110. In this case, it is preferable that a time period that the drive part 120 does not apply the voltage to the coil 110 is close to zero. However, actually, it is preferable to set in a range of a use condition that a time period when a voltage is applied to the coil 110 is about 7 ms and a time period when the voltage is not applied is about 13 ms. Further, it may be configured that, in a case that a current value acquired by the monitoring part 130 becomes lower than the predetermined first current threshold value, the control part 140 changes a frequency of a voltage applied by the drive part 120 to the coil 110 (for example, changes to a lower frequency).

As described above, in this embodiment, magnitude of a voltage applied to the coil for generating a disturbing magnetic field is changed depending on a current value flowing through the coil. Therefore, skimming can be prevented while avoiding damage of the coil.

Second Embodiment

Figure 8:
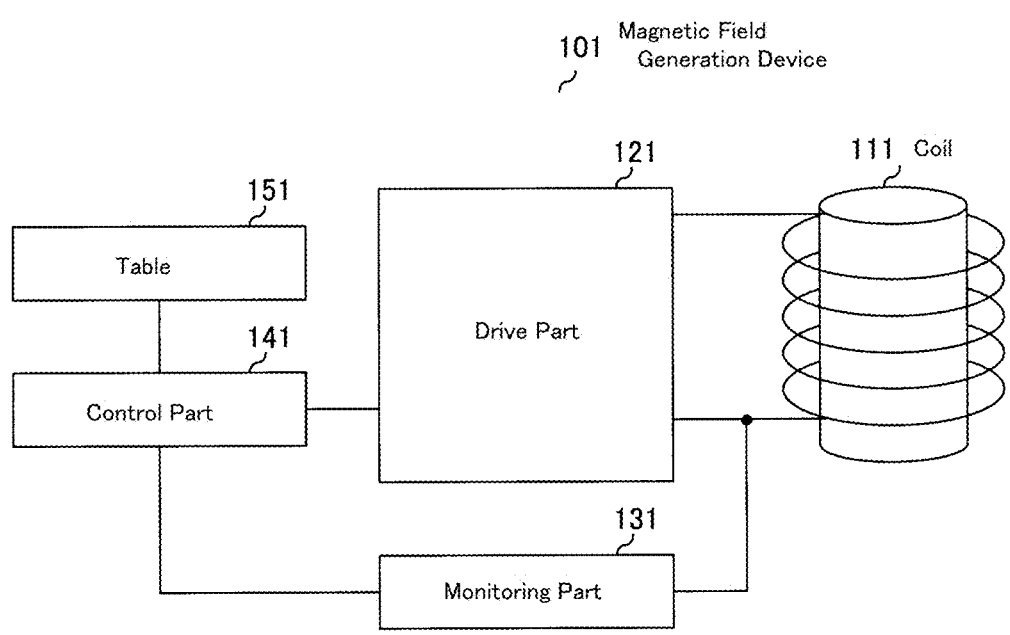
FIG. 8 is a view showing a magnetic field generation device in accordance with a second embodiment of the present invention.

FIG. 8 is a view showing a magnetic field generation device in accordance with a second embodiment of the present invention. A magnetic field generation device 101 in this embodiment includes, as shown in FIG. 8, a coil 111, a drive part 121, a monitoring part 131, a control part 141 and a table 151. The magnetic field generation device 101 is provided in a magnetic card reader and is, for example, provided at a position where magnetic noise can be applied to a skimming head, for example, at a position around an insertion port for a magnetic card. FIG. 8 shows an example of principal structure elements in accordance with this embodiment among structure elements included in the magnetic field generation device 101 in this embodiment.

The coil 111 is a magnetic field generation part to which a voltage is applied and thereby an electric current flows to generate a magnetic field.

The drive part 121 applies a voltage to the coil 111. The drive part 120 applies a voltage corresponding to a fixed magnetic field pattern outputted from the control part 140 to the coil 111.

The monitoring part 131 measures a value of a current flowing through the coil 111. The monitoring part 131 measures a current value of an electric current flowing through the coil 111 when the drive part 121 applies the voltage corresponding to the fixed magnetic field pattern to the coil 110.

The control part 141 reads out a temperature associated with a current value flowing through the coil 111, which is measured by the monitoring part 131, from the table 151. The control part 141 controls the voltage applied by the drive part 121 based on the temperature which is read out from the table 151. When the temperature which is read out from the table 151 exceeds a predetermined first temperature threshold value, the control part 141 changes the voltage applied by the drive part 121 to the coil 111 to a voltage (second voltage) whose maximum value is lower than the maximum value of the voltage (first voltage) which is presently applied. After the control part 141 has changed the voltage applied to the coil 111 to the second voltage, in a case that the temperature which is read out from the table 151 becomes lower than a second temperature threshold value, which is a value smaller than the first temperature threshold value, the control part 141 changes (returns) the voltage applied to the coil 111 to the first voltage. Further, the control part 141 outputs a predetermined fixed magnetic field pattern in order that the monitoring part 131 measures a current value. In this case, the control part 141 may output the fixed magnetic field pattern in a predetermined cycle.

The table 151 stores current values and temperatures which are associated with each other in advance. The association stored in the table 151 may be set as shown in FIG. 4, or may be a table or a graph in which temperatures of the coil 111 and currents flowing through the coil 111 are associated with each other for a voltage value applied to the coil 111. When this association is utilized, a temperature of the coil 111 can be acquired only by measuring a current value flowing through the coil 111 without using a thermometer or a temperature sensor. Especially, it is effective in a case that a thermometer or a temperature sensor is not provided in the magnetic field generation device and a current monitoring circuit which monitors a current flowing through the coil 111 is provided.

Figure 9:
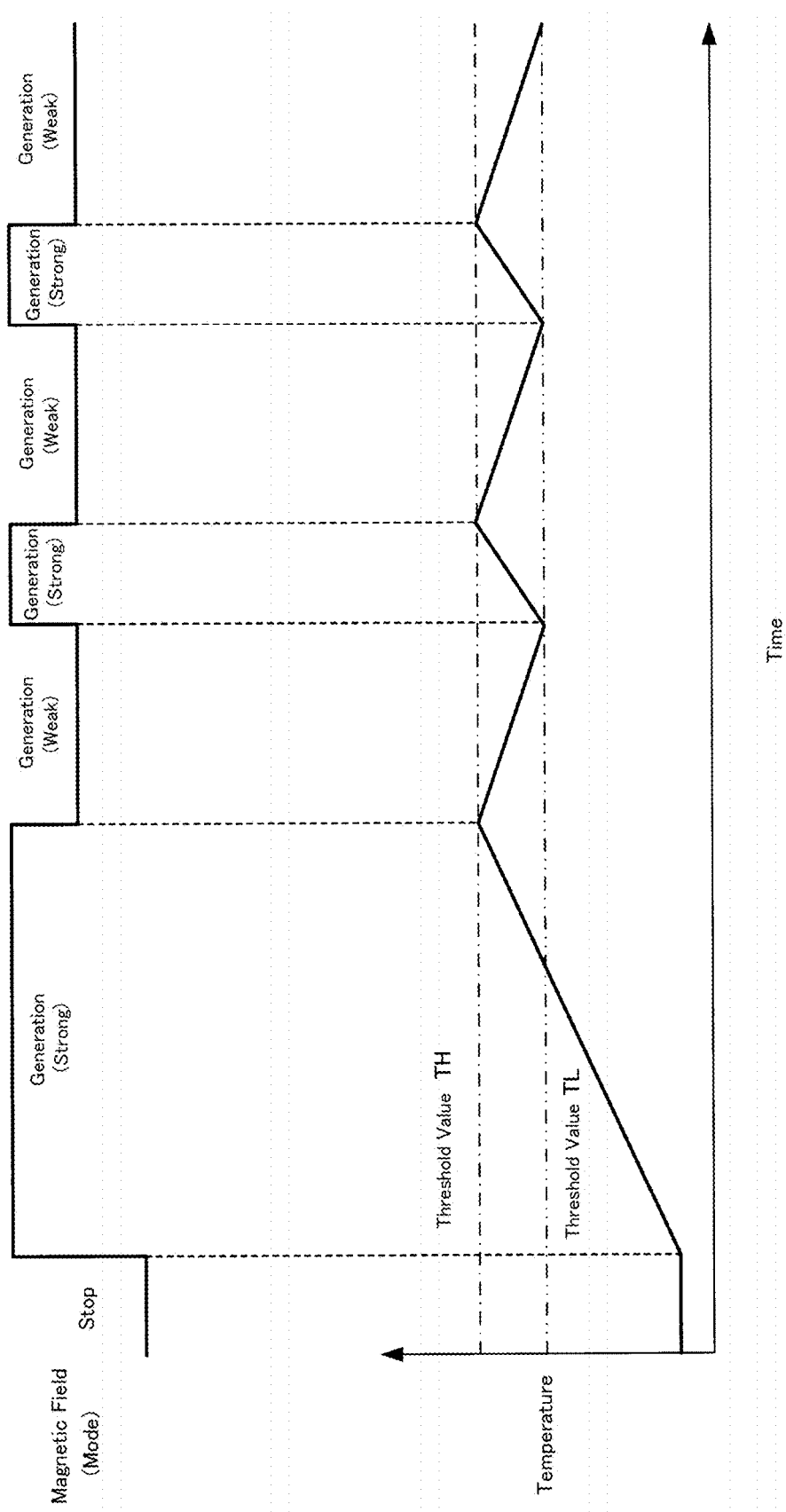
FIG. 9 is a view showing an example of magnetic field generation control in a control part shown in FIG. 8.

FIG. 9 is a view showing an example of magnetic field generation control in the control part 141 shown in FIG. 8. In the example shown in FIG. 9, a temporal change of a current is shown so as to be linearly increased or decreased. However, this indication is for convenience of description and, actually, a temporal change of a current does not always change linearly.

First, in a stop state of a disturbing magnetic field generation, a voltage (first voltage) is applied to supply a current to the coil 111 so as to generate a magnetic field having predetermined intensity. A value of the first voltage is random and is provided with a level which is capable of sufficiently disturbing skimming by a magnetic field generated from the coil 111. Further, an operation mode which is performed by applying the first voltage is a "strong mode". After that, when temperature of the coil 111 is increased and the temperature exceeds a first temperature threshold value (threshold value "TH"), the control part 141 changes the voltage applied by the drive part 121 to the coil 111 to a voltage (second voltage) whose maximum value is lower than the maximum value of the first voltage which is presently applied. The second voltage is set in a level which is capable of disturbing skimming to some extent by a magnetic field generated from the coil 111. Further, an operation mode which is performed by applying the second voltage is a "weak mode". As a result, the temperature of the coil 111 is lowered and, when the temperature becomes lower than a second temperature threshold value (threshold value "TL") which is smaller than the first temperature threshold value, the control part 141 changes the voltage applied by the drive part 121 to the coil 111 to the first voltage (applied voltage is returned) from the second voltage which is presently applied. In this manner, the operation mode is returned to the "strong mode". After that, based on a comparison of a temperature of the coil 111 with the two temperature threshold values, the control part 141 changes the operation mode.

Figure 10:
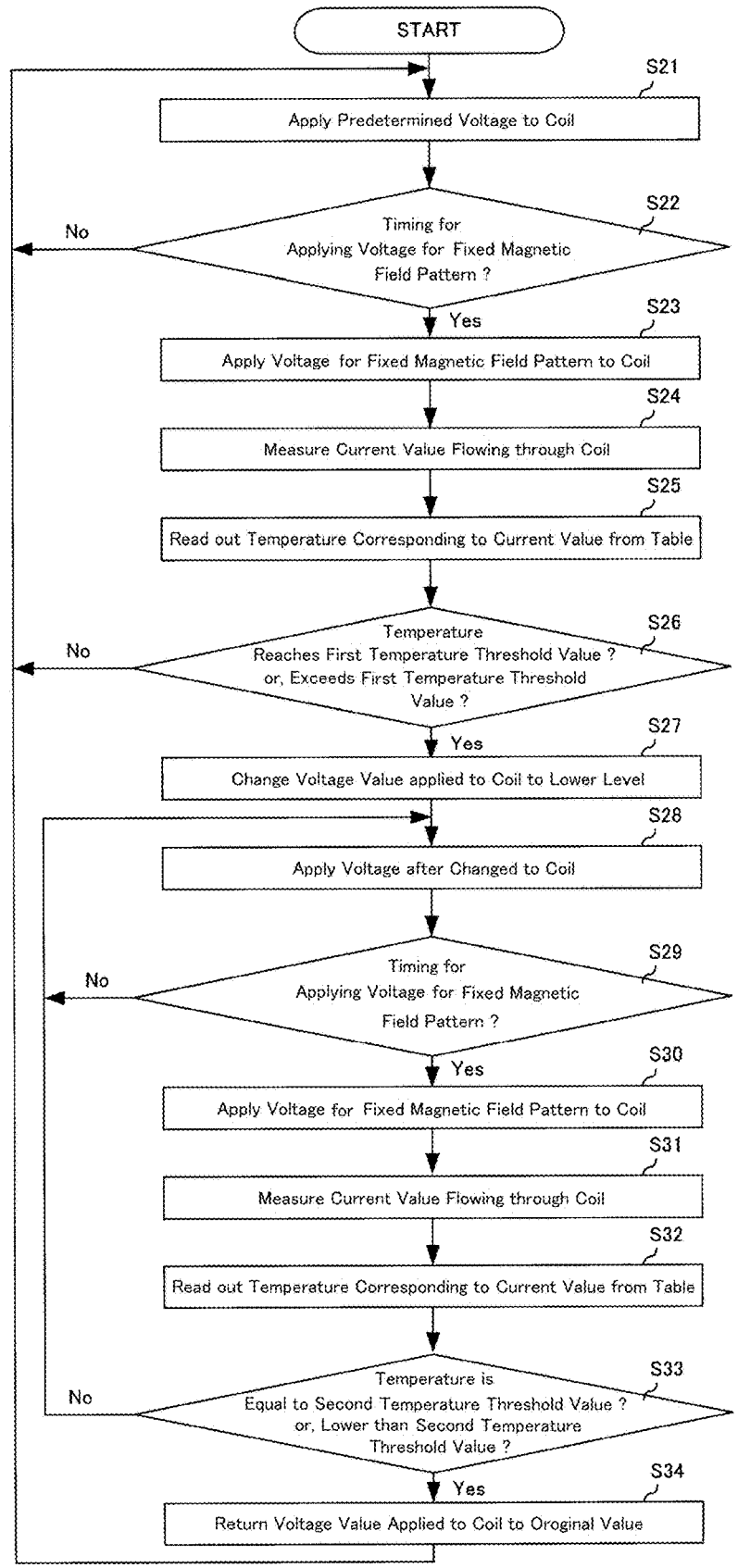
FIG. 10 is a flow chart for explaining an example of a magnetic field generation method in the magnetic field generation device shown in FIG. 8.

Next, a magnetic field generation method in the magnetic field generation device 101 shown in FIG. 8 will be described below. FIG. 10 is a flow chart for explaining an example of a magnetic field generation method in the magnetic field generation device 101 shown in FIG. 8.

First, the control part 141 applies the voltage (first voltage) to the coil 111 by using the drive part 121 (step S21). As a result, a current flows through the coil 111 and the coil 111 generates a disturbing magnetic field. An operation mode of the disturbing magnetic field generation at this time is the "strong mode". The control part 141 determines whether it is timing for applying a voltage corresponding to a predetermined fixed magnetic field pattern to the coil 111 by the drive part 121 or not (step S22). This timing may be set in advance or may be calculated depending on an operating state of the magnetic field generation device 101 or surrounding environment conditions. In a case of timing when the drive part 121 applies a voltage corresponding to a predetermined fixed magnetic field pattern to the coil 111, the control part 141 outputs the predetermined fixed magnetic field pattern and the drive part 121 applies a voltage corresponding to the fixed magnetic field pattern outputted from the control part 141 to the coil 111 (step S23). The fixed magnetic field pattern may be the same as the pattern described in the first embodiment. When the voltage corresponding to the fixed magnetic field pattern is applied to the coil 111, the monitoring part 131 measures a current value flowing through the coil 111 (step S24).

The control part 141 reads out a temperature associated with a current value measured by the monitoring part 131 from the table 151 (step S25). Successively, the control part 141 determines whether the temperature which is read out from the table 151 has reached the first temperature threshold value set in advance or not, or whether the temperature exceeds the first temperature threshold value or not (step S26). When the temperature read out from the table 151 by the control part 141 has reached the first temperature threshold value or, when exceeds the first temperature threshold value, the control part 141 changes the voltage applied by the drive part 121 to the coil 111 to a voltage whose maximum value is lower than a maximum value of the presently applied voltage (step S27). The drive part 121 applies the voltage after changed to the coil 111 (step S28). The operation mode of disturbing magnetic field generation at this time is a "weak mode". After that, the control part 141 determines whether it is timing of the drive part 121 for applying a voltage corresponding to the predetermined fixed magnetic field pattern to the coil 111 or not (step S29). In a case of timing when the drive part 121 applies a voltage corresponding to the predetermined fixed magnetic field pattern to the coil 111, the control part 141 outputs the predetermined fixed magnetic field pattern and the drive part 121 applies a voltage corresponding to the fixed magnetic field pattern outputted from the control part 141 to the coil 111 (step S30). The processing of the step S30 may be the same as the processing of the step S23 or may apply a voltage corresponding to an operation mode which is operated at that time. When the voltage corresponding to the fixed magnetic field pattern is applied to the coil 111, the monitoring part 131 measures a current value flowing through the coil 111 (step S31).

The control part 141 reads out a temperature associated with a current value measured by the monitoring part 131 from the table 151 (step S32). Successively, the control part 141 determines whether the temperature which is read out from the table 151 becomes equal to a second temperature threshold value set in advance or not, or whether the temperature becomes lower than the second temperature threshold value or not (step S33). In a case that the current value measured by the monitoring part 131 becomes equal to the second temperature threshold value or, in a case that the current value becomes lower than the second temperature threshold value, the control part 141 returns the voltage applied by the drive part 121 to the coil 111 to the original voltage, that is, the voltage applied in the step S21 (step S34).

In accordance with an embodiment of the present invention, the control part 141 may be configured that, in a case that a temperature read out from the table 151 exceeds the predetermined first temperature threshold value, the drive part 121 intermittently applies a voltage to the coil 111. In this case, it is preferable that a time period that the drive part 121 does not apply the voltage to the coil 111 is close to zero. However, actually, it is preferable to set in a range of a use condition that a time period when a voltage is applied to the coil 111 is about 7 ms and a time period when the voltage is not applied is about 13 ms. Further, it may be configured that, in a case that a temperature read out from the table 151 exceeds the predetermined first temperature threshold value, the control part 141 changes a frequency of a voltage applied by the drive part 121 to the coil 111.

As described above, in this embodiment, magnitude of a voltage applied to the coil for generating a disturbing magnetic field is changed depending on a temperature of the coil. In other words, a voltage applied to the coil is controlled so that the temperature of the coil does not rise to a temperature which causes damage. Therefore, skimming can be prevented while avoiding damage due to temperature rise of the coil. In accordance with an embodiment of the present invention, the magnetic field generation device 101 in this embodiment may be mounted on the card reader 200 shown in FIG. 1 instead of the magnetic field generation device 100.

Other Embodiments

Although the present invention has been shown and described with reference to a specific embodiment, various changes and modifications will be apparent to those skilled in the art from the teachings herein. For example, in the above-mentioned embodiments, a current value flowing through a coil or a temperature is used as state information. However, amplitude of a disturbing magnetic field generated from the coil or a voltage value applied to the coil may be used as state information. Amplitude of a disturbing magnetic field may be measured by using a Hall element or the like. According to this structure, for example, in a device on which a Hall element is already mounted for another application, the similar effects to the above-mentioned effects can be obtained without adding another element (circuit) for acquiring state information. Further, in a device which is already provided with a thermometer or a temperature sensor, it may be structured that the above-mentioned processing is performed by using temperature detected by the thermometer or the temperature sensor.

Further, in the structures of the embodiments described above, as examples, each of the control parts 140 and 141 controls a voltage which is applied by each of the drive parts 120 and 121 to each of the coils 110 and 111. However, it may be structured that each of the control parts 140 and 141 controls, similarly to a voltage, a current flowing through each of the coils 110 and 111 by each of the drive parts 120 and 121. Further, in the embodiments described above, as an example, the maximum value of the second voltage is lower that of the first voltage. However, it may be configured that an average value or an effective value of the second voltage is lower than that of the first voltage. Further, in the embodiments described above, as an example, two threshold values are set for controlling a voltage which is applied to each of the coils 110 and 111. However, in a case that the temperature is further low, or the like, for example, it may be configured that a third current threshold value or a third temperature threshold value is set to change to a "high strong mode" in which a further high voltage is applied to the coils 110 and 111. According to this structure, security can be further enhanced.

As described above, in the embodiments described above, each of the respective structure elements provides each of respective functions (processing), but the allocation is not limited to the embodiments described above. Further, the structures of the structure elements in the embodiments described above are only examples and are not limited to the above-mentioned structures. Further, the embodiments described above may be combined with each other.

What is claimed is:

1. A magnetic recording medium processing apparatus for use with a magnetic card, the magnetic recording medium processing apparatus comprising:
   a card insertion port into which the magnetic card is inserted;
   an information reading part structured to read predetermined information from the magnetic card inserted into the card insertion port; and
   a magnetic field generation device structured to disturb illegal reading of magnetic data recorded in the magnetic card, the magnetic field generation device comprising:
      a magnetic field generation part structured to generate a magnetic field;
      a drive part configured to apply a voltage to the magnetic field generation part or to supply a current to the magnetic field generation part;
      a monitoring part configured to acquire state information whose value is varied together with temperature of the magnetic field generation part; and
      a control part configured to control the voltage which is applied by the drive part, or configured to control the current which is supplied by the drive part based on the state information acquired by the monitoring part.

2. The magnetic recording medium processing apparatus according to claim 1, wherein the control part changes:
   based on a comparison result between a value indicated by the state information acquired by the monitoring part and a predetermined threshold value,
   the voltage applied by the drive part to the magnetic field generation part from a presently applied voltage to a different voltage which is different from the presently applied voltage; or
   the current supplied by the drive part to the magnetic field generation part from a presently supplied current to a different current which is different from the presently supplied current.

3. The magnetic recording medium processing apparatus according to claim 1, wherein
   the monitoring part acquires a current value flowing through the magnetic field generation part as the state information, and
   the control part controls the voltage applied by the drive part or the current supplied by the drive part based on the current value acquired by the monitoring part.

4. The magnetic recording medium processing apparatus according to claim 3, wherein in a case that the current value acquired by the monitoring part becomes lower than a predetermined first current threshold value, the control part changes the voltage applied by the drive part to the magnetic field generation part to a second voltage whose maximum value is lower than a maximum value of a first voltage which is presently applied.

5. The magnetic recording medium processing apparatus according to claim 4, wherein the control part is configured so that, after the control part has changed the voltage applied to the magnetic field generation part to the second voltage, when the current value acquired by the monitoring part exceeds a second current threshold value which is larger than the first current threshold value, the control part changes the voltage applied to the magnetic field generation part to the first voltage.

6. The magnetic recording medium processing apparatus according to claim 3, wherein
   the control part outputs a predetermined fixed magnetic field pattern,
   the drive part applies a voltage corresponding to the fixed magnetic field pattern outputted from the control part to the magnetic field generation part, and
   the monitoring part acquires a current value flowing through the magnetic field generation part when the drive part applies the voltage corresponding to the fixed magnetic field pattern to the magnetic field generation part.

7. The magnetic recording medium processing apparatus according to claim 3, further comprising a table in which current values and temperatures are associated with each other,
   wherein the control part reads out a temperature associated with a current value acquired by the monitoring part from the table, and the control part controls the voltage applied by the drive part based on the temperature read out.

8. The magnetic recording medium processing apparatus according to claim 7, wherein the control part is configured so that, when the temperature read out from the table exceeds a predetermined first temperature threshold value, the control part changes the voltage applied by the drive part to the magnetic field generation part to a second voltage whose maximum value is lower than a maximum value of a first voltage which is presently applied.

9. The magnetic recording medium processing apparatus according to claim 8, wherein the control part is configured so that, after the control part has changed the voltage applied to the magnetic field generation part to the second voltage, when the temperature read out from the table becomes lower than a second temperature threshold value which is smaller than the first temperature threshold value, the control part changes the voltage applied by the drive part to the magnetic field generation part to the first voltage.

10. A magnetic field generation method for using with a magnetic card, the method comprising:
   inserting the magnetic card into a card insertion port;
   reading predetermined information from the magnetic card inserted into the card insertion port;
   disturbing illegal reading of magnetic data recorded in the magnetic card;
   processing applying a voltage to a coil which generates a magnetic field or supplying a current to the coil;
   processing acquiring state information whose value is varied together with temperature of the coil; and
   processing controlling a voltage applied to the coil or a current supplied to the coil based on the state information acquired.

11. The magnetic field generation method according to claim 10, wherein
   based on a comparison result between a value indicated by the state information acquired and a predetermined threshold value,
   processing is performed in which the voltage applied to the coil is changed from a presently applied voltage to a different voltage which is different from the presently applied voltage, or
   processing is performed in which the current supplied to the coil is changed from a presently supplied current to a different current which is different from the presently supplied current.

12. The magnetic field generation method according to claim 10, wherein
   processing is performed in which a current value flowing through the coil is acquired as the state information, and
   processing is performed in which, based on the current value acquired, the voltage applied to the coil is controlled or the current supplied to the coil is controlled.

13. The magnetic field generation method according to claim 12, wherein
   processing is performed in which, in a case that the current value acquired becomes lower than a predetermined first current threshold value, the voltage applied to the coil is changed to a second voltage whose maximum value is lower than a maximum value of a first voltage which is presently applied.

14. The magnetic field generation method according to claim 12, wherein
   processing is performed in which a temperature associated with the current value acquired is read out from a table in which current values and temperatures are associated with each other, and
   processing is performed in which the voltage applied to the coil is controlled based on the temperature read out from the table.

15. The magnetic field generation method according to claim 14, wherein
   in a case that the temperature read out from the table exceeds a predetermined first temperature threshold value,
   processing is performed in which the voltage applied to the coil is changed to a second voltage whose maximum value is lower than a maximum value of a first voltage which is presently applied.

16. The magnetic recording medium processing apparatus according to claim 1, wherein the control part of the magnetic field generation device changes:
   based on a comparison result between a value indicated by the state information acquired by the monitoring part and a predetermined threshold value,
   the voltage applied by the drive part to the magnetic field generation part from a presently applied voltage to a different voltage which is different from the presently applied voltage; or
   the current supplied by the drive part to the magnetic field generation part from a presently supplied current to a different current which is different from the presently supplied current.

17. The magnetic recording medium processing apparatus according to claim 1, wherein
   the monitoring part of the magnetic field generation device acquires a current value flowing through the magnetic field generation part as the state information, and
   the control part controls the voltage applied by the drive part or the current supplied by the drive part based on the current value acquired by the monitoring part.

18. The magnetic recording medium processing apparatus according to claim 17, wherein in a case that the current value acquired by the monitoring part becomes lower than a predetermined first current threshold value, the control part changes the voltage applied by the drive part to the magnetic field generation part to a second voltage whose maximum value is lower than a maximum value of a first voltage which is presently applied.

19. The magnetic recording medium processing apparatus according to claim 17, wherein
   the magnetic field generation device further comprises a table in which current values and temperatures are associated with each other, and
   the control part reads out a temperature associated with a current value acquired by the monitoring part from the table, and the control part controls the voltage applied by the drive part based on the temperature read out.

20. The magnetic recording medium processing apparatus according to claim 19, wherein the control part is configured so that, when the temperature read out from the table exceeds a predetermined first temperature threshold value, the control part changes the voltage applied by the drive part to the magnetic field generation part to a second voltage whose maximum value is lower than a maximum value of a first voltage which is presently applied.

* * * * *